United States Patent
Skuratowicz

(10) Patent No.: US 6,228,158 B1
(45) Date of Patent: May 8, 2001

(54) PREBLENDED CARRIER STARCHES FOR CORRUGATING ADHESIVES

(75) Inventor: Roman Skuratowicz, Hickory Hills, IL (US)

(73) Assignee: Corn Products International, Inc., Bedford Park, IL (US)

( * ) Notice: Subject to any disclaimer, the term of this patent is extended or adjusted under 35 U.S.C. 154(b) by 0 days.

(21) Appl. No.: 09/293,610

(22) Filed: Apr. 16, 1999

(51) Int. Cl.⁷ .......................... C09J 103/10; B32B 29/08
(52) U.S. Cl. .................... 106/208.1; 106/208.3; 106/617; 156/291; 156/336; 428/182
(58) Field of Search ................ 106/617, 208.1, 106/208.3, 210.1, 217.3; 156/291, 336; 428/182

(56) References Cited

U.S. PATENT DOCUMENTS

| | | | |
|---|---|---|---|
| 2,669,282 | 2/1954 | Kreyling | 154/33 |
| 3,272,675 | 9/1966 | Suzumura et al. | 156/292 |
| 3,630,774 | 12/1971 | Knight | 127/32 |
| 3,704,148 | 11/1972 | Wright et al. | 106/79 |
| 3,970,467 | 7/1976 | Voight et al. | 106/213 |
| 4,060,506 | 11/1977 | Verbanac | 260/17.4 |
| 4,079,025 | 3/1978 | Young et al. | 260/17.4 |
| 4,240,841 | 12/1980 | DeDominicis | 106/211 |
| 4,600,739 | 7/1986 | Krankkala | 524/48 |
| 4,788,280 | 11/1988 | Billmers et al. | 536/104 |
| 4,855,354 | 8/1989 | Mohler et al. | 525/54.24 |
| 4,941,922 | 7/1990 | Snyder | 106/214 |
| 5,358,559 | 10/1994 | Fitt et al. | 106/213 |
| 5,454,863 * | 10/1995 | Foran et al. | 106/213 |
| 5,501,772 | 3/1996 | Elliott et al. | 162/163 |
| 5,501,773 | 3/1996 | Elliott et al. | 162/163 |
| 5,567,277 | 10/1996 | Elliott et al. | 162/163 |
| 5,571,316 | 11/1996 | Gill | 106/617 |
| 5,641,349 | 6/1997 | Koubek et al. | 106/206.1 |
| 5,647,956 | 7/1997 | Elliott et al. | 162/163 |
| 5,753,078 | 5/1998 | Koutitonsky et al. | 162/135 |
| 5,830,548 | 11/1998 | Andersen et al. | 428/36.4 |

FOREIGN PATENT DOCUMENTS 1056107  6/1979  (CA) .

* cited by examiner

Primary Examiner—David Brunsman
(74) Attorney, Agent, or Firm—Norris, McLaughlin & Marcus

(57) ABSTRACT

A dry preblended carrier starch for corrugating adhesive compositions comprising modified starch and a dry alkali, the modified starch being preferably oxidized starch and the dry alkali being sodium metasilicate or trisodium phosphate. The dry preblended carrier starch for corrugating adhesives has improved viscosity stability over time and temperature fluctuations, eliminates the need for added caustic at end use or at the corrugator and does not require additional silicate compounds in the corrugating adhesive.

16 Claims, No Drawings

PREBLENDED CARRIER STARCHES FOR CORRUGATING ADHESIVES

BACKGROUND OF THE INVENTION

1. Field of the Invention

The invention relates to a carrier starch for corrugating adhesives wherein modified starch is preblended with dry alkali, to make a preblended carrier starch which eliminates the need for caustic at the corrugator and exhibits improved viscosity and storage stability over time. The dry alkali also obviates the need to add silicate compounds in a corrugating adhesive composition. Specifically, the present invention is a preblended carrier starch comprising a modified starch, such as oxidized starch, and a dry alkali such as sodium metasilicate or trisodium phosphate.

2. Description of the Related Art

Adhesives used in manufacturing corrugated board are usually comprised of starch, caustic, a boron containing compound and, where water resistance is needed, a waterproofing resin. Adhesives are also known in the art which comprise an alkali, such as a silicate. The main binder of corrugating paper is the starch which is gelatinized in the corrugating process as it penetrates the paper fiber. The other components, namely, the caustic, boron containing compounds, and waterproofing resin are auxiliary agents which modify the basic properties of the starch.

Caustic, usually in the form of sodium hydroxide, directly affects the gelatinization point temperature of the starch. Caustic also enhances penetration of the gelatinized starch into the surface paper fibers allowing for better bonding.

The boron containing compounds perform multiple tasks. The most important function is developing the adhesive tackiness that is crucial in the formation of the green bond. The green bond is the bond which holds the components of the corrugated board together until final heat curing of the adhesive system. It relies solely on the viscosity of the adhesive to maintain the integrity of the product during curing. Corrugating machine speeds therefore are limited by the rate of viscosity increase (i.e., rate of green bond formation) in the bond line between the liner and the corrugated medium. The oxygen atoms attached to the boron form stronger bonds, sometimes called boron bridges, between the starch and cellulose hydroxyl groups. Boron containing compounds also act as buffering agents in the presence of caustic and help maintain the viscosity stability of the adhesive paste.

Water proof or water resistant resins are considered to be an optional component of adhesives, and although some corrugating plants may not need them, most plants are prepared to use them when needed. Many types of thermosetting resins are suitable. The most common of them are derived from urea-formaldehyde, ketone-formaldehyde or melamine-formaldehyde. When heat and pressure is applied to them in a corrugating machine, they will condense to form an excellent water resistant network.

In the corrugating process, adhesive is commonly applied to the tips of the flutes of a corrugated medium. Then a noncorrugated flat paper liner is applied against the adhesive coated flutes as they pass between a corrugating roll and a pressure roll. The resulting product has the corrugating medium on one side and a flat liner on the other side and is called a single-faced portion. The single-faced portion may be used "as is" (called a "single facer" board) or adhesive may be applied to the flute tips of the single-faced portion and a second flat sheet can be applied in the same manner as the first in what is called a "double-facer" or a "double-backer" operation. The second liner sheet is treated with heat and reduced pressure (relative to the pressure used to make single-faced portion) immediately following contact with the adhesive.

Starch-based adhesives which can be of the carrier, no-carrier and carrier-no-carrier type are commonly used in processes for manufacturing corrugated paper board. In carrier type adhesives, such as those relating the present invention, a portion of the starch forms a carrier, often known as the gelatinized phase, which suspends the balance of the starch which is in an ungelatinized state. Under conditions of heat and pressure, the ungelatinized starch is rapidly hydrated and gelatinized to increase quickly the viscosity and adhesivity of the adhesive composition. In no-carrier type adhesives, all of the starch is slightly cooked or swollen with heat and caustic soda for viscosity. Finally, carrier-no-carrier type adhesives have a portion of the starch which forms a carrier and is responsible for about one half of the viscosity and the remaining viscosity is obtained by slightly swelling the uncooked starch.

With carrier type and carrier-no-carrier type adhesives, the carrier portion of the adhesive composition can be said to exist separately from the adhesive. As such, a carrier starch may be added by the end user to the other components of the adhesive at the corrugator or the carrier may be added to the other components of the adhesive prior to end use at the corrugator. The invention involves carrier starches which can be added to other components to form an adhesive either at the corrugator or by the end user prior to the corrugating process. The carrier starches of the present invention exhibit enhanced storage stability, and in particular excellent viscosity stability over time. Thus, the carrier starches of the invention are superior for use at the corrugator, or prior to the corrugating process, depending on the needs and requirements of the end user.

U.S. Pat. No. 5,571,316 issued to Gill describes silicate-dextrin adhesives comprising sodium metasilicate; dextrin; alkali metal silicate, such as sodium silicate or potassium silicate; sodium metaborate octhydrate or sodium metaborate tetrahydrate and water. The adhesive compositions in U.S. Pat. No. 5,571,316 are particularly useful in making paper tubes, corrugated boards and angle boards wherein layers of paper are adhered to each other by the adhesive formulation. Dextrin is, generally, treated with acid to make it soluble and useful as a component of adhesive formulations. Acid treatment of dextrin, however, results in low viscosity and, consequently, adhesives made from dextrin require bulking to increase the solids content acceptable for corrugating adhesives. Accordingly, Gill teaches that dextrin-silicate adhesive formulations require solids content of from about 30% by weight to about 44% by weight.

Adhesive compositions comprising sodium silicates and clay are known in the art. For example, U.S. Pat. No. 2,669,282 issued to Kreyling, describes a wet adhesive composition comprising sodium silicate, starch and siliceous material such as kaolinitic clay or diatomaceous earth. These adhesive compositions, however, are quite distinct from the starch/dry alkali preblended carrier starches of the present invention.

Canadian Patent 1056107 granted to PQ Corporation, U.S.A. concerns starch-silicate adhesive compositions. These adhesive compositions can be prepared with 8% to 40% of the solids as alkali metal silicate and 60% to 92% of the solids as starch. These adhesive compositions do not involve the use of most modified starches, and generally require caustic and silicate.

It has now been found that preblending modified starch, particularly oxidized starch, with a dry alkali produces a carrier starch for corrugating adhesives which eliminates the need for a caustic at the time that the adhesive is prepared for use at the corrugator by allowing for an adjustment of the carrier to an appropriate pH to promote swelling or gelling of the starch. The preblended carrier starches of the invention also do not require added silicate, such as a metal silicate source, in the carrier phase or for a corrugating adhesive composition formulated with the carrier starch. It has now been found that the use of modified starches in accordance with the invention and, in particular, oxidized starch enhances the viscosity stability of the adhesive compositions over time and temperature fluctuations.

It is further found that sodium metasilicate has unexpected advantages compared with calcium salts, as the dry alkali in the blend, because sodium metasilicate eliminates the crosslinking of the starch in the carrier type adhesive that is experienced when calcium salts are used as the dry alkali. Trisodium phosphate is also a useful dry alkali in the invention. The buffering effect of the dry alkali salt, such as sodium metasilicate or trisodium phosphate, also reduces the effect from water ions and dissolved solids on adhesive viscosity.

It is also found that the use of a dry alkali in the carrier starches of the invention advantageously makes it unnecessary to employ two conventional chemicals for end use or at the corrugator. Accordingly, the dry alkali allows for elimination of the need for added caustic at the corrugator or when the carrier starch of the present invention is prepared for use. The dry alkali, particularly sodium metasilicate, in the carrier starch, can also replace the use of additional metal silicates in the carrier phase or in the adhesive composition.

In the present specification and claims, all parts and percentages are by weight/weight unless otherwise specified.

SUMMARY OF THE INVENTION

The dry preblended carrier starches for corrugating adhesives comprise an admixture of from about 70% to about 90% modified starch and from about 30% to about 10% dry alkali based on total dry weight of modified starch and dry alkali in the dry preblended carrier. The dry alkali is sodium metasilicate or trisodium phosphate, with sodium metasilicate most preferred. The dry preblended carrier starches for corrugating adhesives may also comprise mineral oil which serves to reduce dusting, and other conventional components including fillers and bulking agents.

The dry preblended carrier starches for corrugating adhesives are prepared by dry blending the modified starch and dry alkali. The preblended carrier starch is prepared for use as the carrier phase in a corrugating adhesive composition by mixing the preblend with heated water in a vessel or container with a means for agitation, such as a mechanical mixer. After the preblended carrier starch and water are mixed and the carrier phase established, cooling water may be added and agitation continued. In one embodiment of the invention, the modified starch and dry alkali are mixed for about 20 minutes in water, heated under agitation to a temperature greater than about 120° F., and preferably about 135° F., and after around 20 minutes cooling water is added and the solution is mixed for about an additional five minutes.

Corrugating adhesive compositions can be formulated using the dry preblended carrier starches of the invention. Adhesive formulations can be prepared at the corrugator or can be prepared prior to end use. Adhesive compositions can be formulated by mixing the carrier phase prepared from the dry preblended carrier starch with a premixed suspended phase comprising components such as water, borax and other starches. It is not necessary for caustic to be added at the corrugator when making adhesive formulations with the preblended carrier starch of the invention. It is also unnecessary to add silicates with the carrier starch or when formulating adhesive compositions that comprise the dry preblended carrier starch. Of course, the corrugator may add caustic and/or silicates without any detrimental effects if it is believed that a slight pH adjustment or additional silicate might be needed for a particular application. Corrugating adhesive compositions prepared with the carrier starches of the invention can be applied to the tips of flutes of corrugated medium to make single facer and/or double facer board, in addition to other paper based products.

DETAILED DESCRIPTION OF THE INVENTION

The dry preblended carrier starch for corrugating adhesives comprise from about 70% to about 90% modified starch, which is preferably in the form of oxidized starch but may also be in the form of dextrin, and from about 30% to about 10% dry alkali in the form of sodium metasilicate or trisodium phosphate. The corrugating adhesive may also comprise other components, fillers and bulking agents, and mineral oils to reduce dusting.

The dry preblended carrier starch for corrugating adhesives are generally made by dry mixing modified starch and dry alkali to make an admixture. The carrier starch may be dissolved in heated water to form the carrier phase for carrier type adhesives. The preblended modified starch/dry alkali carrier starch can be placed in a vessel or container with a means for agitation, such as a mechanical mixer, and dissolved in water, previously heated under agitation to a desired temperature. Sufficient water is added to dissolve the preblended carrier starch and to make a carrier phase as will be apparent to those skilled in the art based on the disclosures herein. The temperature of the heated water should be at least about 120° F., and preferably about 135° F., with a maximum temperature up to about 180° F. in conventional equipment or up to 400° F. under steam injected pressure using a jet cooker. The water can be preheated under agitation in the vessel in which the preblended carrier starch is dissolved. The carrier starch is agitated in the heated water until such time that the carrier starch is in solution and swells and/or gels after which time cooling water, if necessary may be added to the vessel or container holding the dissolved preblended carrier starch, and agitation continued.

In the carrier phase, the dry alkali comprises from about 1% to about 8% of the carrier phase, prior to introduction of cooling water; based on total weight of carrier starch and heated water.

The carrier phase is combined with other components, such as a suspended phase comprising borax and pearl starch, to formulate corrugating adhesives. In the corrugating adhesive, the dry alkali may comprise from about 0.2% to about 4.5% based on total weight of the adhesive composition, e.g. wet weight. The modified starch of the carrier phase may comprise from about 2% to about 10% of the total weight of the adhesive composition, i.e., wet weight. The corrugating adhesives comprising the carrier starches do not require added caustic at the corrugator or at any time prior to end use, and there is no need to add silicate compounds. It has been found that corrugating adhesives comprising the preblended carrier starch have improved storage stability and storage viscosity.

Table 1 illustrates the alkalinity value, measured by pH, of solutions containing caustic and sodium metasilicate at various weight percentages. The data for Table 1 was obtained from the CRC Handbook of Chemistry and Physics, 64th Edition. The data of Table 1 illustrates one of the advantages of the dry preblended carrier starch of the invention, that is the addition of a slightly greater amount of dry alkali in the preblend, compared to the amount of caustic needed at the corrugator, will result in a carrier phase with the desired pH value to promote swelling and gelling of the starch whereby eliminating the need for caustic at the corrugator. An amount of dry alkali, such sodium metasilicate or trisodium phosphate, around 3 to around 5 times the amount of caustic needed at the corrugator is expected to achieve nearly equivalent alkalinity as measured by pH. For instance, carrier phase with about 5.0% sodium metasilicate provides the same pH, 13.1, as if an amount of caustic was added at the corrugator to comprise about 1.0% of the carrier phase.

TABLE 1 pH of Various Weight Percent Solutions

| Material | Wt % | | | | |
|---|---|---|---|---|---|
| | 0.1 | 0.5 | 1.0 | 2.0 | 5.0 |
| Caustic Soda | 11.9 | 12.7 | 13.1 | 13.3 | 13.8 |
| Sodium Metasilicate | 11.3 | 12.1 | 12.3 | 12.7 | 13.1 |

The amount of dry alkali in the carrier phase prior to adding cooling water is critical for the elimination of caustic by the corrugator or prior to end use. It has been found that carrier phases comprising the dry preblended carrier starch of the invention with from about 1% to about 8% dry alkali based on total weight of the carrier phase, e.g. after dissolving the dry alkali in heated water, but prior to adding cooling water, results in a pH profile for a corrugating adhesive similar to adhesive compositions comprising a caustic soda, such as sodium hydroxide (NaOH), added at the corrugator. Control of pH of the carrier phase within desired ranges is necessary for creating an adhesive composition because the pH is a component of the swelling and gelling of the starch in the carrier phase. Dry alkali at between about 1% to about 8% in the carrier phase correlates to a dry preblend composition of the invention of between about 10% to about 30% based on total dry weight of modified starch and dry alkali in the dry preblended carrier starch.

Modified starches are used for the carrier starch for corrugating adhesives. Modified starch is preferred because it enables the dissolution of substantially more solids (up to twice the amount attainable with unmodified starch) in the adhesive composition and therefore contributes to the development of better green bonding and to adhesive characteristics. The reason is that modified starches, when pasted in water, are less viscous than their unmodified counterparts, and as a consequence they can "carry" more ungelatinized starch at practical viscosities. The use of oxidized starch over other modified starches is more preferred because oxidized starch provides the most enhanced adhesive viscosity stability over time and temperature fluctuations. This is a desirable quality for a carrier starch because it allows storage of the corrugating adhesive after formulation.

The modified starch which is used in accordance with the present invention can be mechanically, chemically or heat modified. Compared to unmodified starches, modified starches frequently possess superior physical properties such as increased solubility, better film forming, increased whiteness, improved gel strength, viscosity stability, increased adhesivity, improved resistance to shear and increased resistance to freeze-thaw degradation.

Starches derived from the root, stem or fruit of a number of plants can be used according to the invention. Examples of suitable starch sources include, corn, wheat, potato, beet, tapioca, rice, sago and manioc. Other genetic forms of corn, such as high amylose and waxy corn as well as sorghum varieties would also be suitable. This list is by no means complete and applicant intends to include starches derived from any farinaceous material.

Suitable chemically modified starches include modified oxidized starch such as hypochloriteoxidized starch, acid-thinned starch, ethylated starch, cross-bonded starch, cationic starch, acetylated starch, starch monophosphates and others which have reduced molecular weight, higher fluidity and/or functional sub groups.

Examples of chemically modified starches which can be used in the invention and are commercially available are SUREBOND® or STABLEBOND® modified starches which have residual carboxyl functionality and extreme uniformity and are sold by Corn Products International, Inc., 6500 South Archer Avenue, Bedford Park, Ill. 60501-1933.

The preferred dry alkali mineral salt suitable for the dry preblended carrier starch for corrugating adhesives is sodium metasilicate. Sodium metasilicate is a dry alkali which has the chemical formula of $Na_2SiO_3$ and is commonly prepared by fusing sand ($SiO_2$) and soda ash ($Na_2CO_3$). Sodium metasilicate provides a pH similar to sodium hydroxide, although some concentration corrections may be necessary. Thus, incorporation of sodium metasilicate into the carrier starch will eliminate the need for the addition of caustic, such as sodium hydroxide, at the corrugator or by the end user. Accordingly, a cost savings is achieved because the corrugator does not have to purchase and handle caustic at all. As noted above, however, the corrugator may add caustic if it is believed that a pH adjustment is needed for a particular application. This would be in a very small quantity, however, relative to the prior art. Carrier starch blends comprising sodium metasilicate, or other silicate compounds, also eliminate the need to add other silicate compounds in the adhesive compositions. Silicates are good adhesives but they are expensive. According to the present invention, the benefits of silicates are achieved by using them in smaller quantities and without adding other components and this results in a cost savings compared with the prior art. As with the caustic, however, the corrugator has the option of adding silicate if it is believed necessary for a particular application.

Calcium in mineral salts comprising calcium, e.g. calcium salts, will cross link the starch in a starch/mineral salt adhesive blend. Sodium metasilicate is preferred over calcium salts because the sodium metasilicate will not cross link the modified starch.

Blending sodium metasilicate with modified starch results in a carrier starch for corrugating adhesives that does not require a caustic at the corrugator or for end use, and has better viscosity stability. Trisodium phosphate is also a suitable dry caustic to blend with modified starch to make an acceptable carrier starch that does not require a caustic at the corrugator or for end use, and has better viscosity stability and storage stability.

The dry preblended carrier starch for corrugating adhesives is formulated into an adhesive composition generally by a two phase method. In the first phase a carrier phase is created by mixing the dry preblended modified starch/dry alkali carrier with sufficient water such that the dry alkali is about 1% to about 8% based weight of the total carrier phase which generally corresponds to about 10% to about 30% dry alkali in the dry preblended modified starch/dry alkali carrier starch based of the total dry weight of modified starch and dry alkali in the preblend. Prior to mixing the dry preblended modified starch/dry alkali carrier starch with water, the water is heated to a temperature of at least about 120° F. and preferably about 135° F. A means for agitating the heated water and components, including the dry preblend, is provided, which means may be a container or vessel capable of holding liquids comprising a means for agitating, such as mechanical mixer. The heated water and other components are agitated for a period of time to form a solution and to cause swelling and/or gelling of the modified starch, after which cooling water may be added and agitation continued for a period of time. In any event, the amount of dry alkali in the solution prior to adding cooling water is about 1% to about 8% based on total weight of the carrier phase prior to adding cooling water. Thus, the carrier phase of the corrugating adhesive, which comprises the dry preblended carrier starch of the invention, is obtained.

A second phase of the adhesive, the suspended phase, is prepared by blending starch, borax and water through a means for agitation, such as a container or vessel capable of holding liquids comprising a means for agitating, such as, for example a mechanical mixer. The carrier phase and the suspended phase are then bended through a means for agitation in the form of a vessel or container suitable for holding liquids comprising a means for agitation, such as a mechanical mixer, to form the corrugating adhesive.

Typically, the corrugating adhesives comprising the modified starch/dry alkali carrier starches of the invention are applied to the tips of the flutes of a corrugating medium. Noncorrugated paper liner is then applied against the adhesive coated flutes and sufficient pressure is applied at the appropriate temperatures to cause the starch in the adhesive formulation to further gelatinize. In this manner, the carrier starch of the invention can be used as a component of a corrugating adhesive to make a single faced board, a single face portion, which can be used "as is".

The single faced portion, however, can also be used with corrugating adhesives comprising the modified starch/dry alkali carrier starches of the invention, to make a double faced board. In this embodiment, the corrugating adhesive is applied to the flute tips of the single faced portion and an additional noncorrugated liner is applied to the flute tips of the single faced portion at sufficient pressure and appropriate temperature to further gelatinize the starch in the adhesive composition.

EXAMPLE I

An adhesive formulation was prepared with the dry preblended carrier starch of the invention. The dry preblended carrier starch was prepared using G551 STABLEBOND® starch, and sodium metasilicate for the dry alkali. 125 grams of starch were dry mixed with 17.8 grams of sodium metasilicate which corresponds to a dry blend comprising about 87.5% dry weight starch and about 12.5% dry weight sodium metasilicate. 600 milliliters of water were placed in the primary portion of a laboratory two stage Stein Hall mixer and heated to about 135° F. under agitation. When the temperature of the water in the primary portion of the mixer reached about 135° F. the dry blend mixture of oxidized starch and sodium metasilicate was introduced into the primary portion of the Stein Hall mixer and agitation was continued for approximately 20 minutes. After around 20 minutes, 200 milliliters of cooling water were introduced into the primary portion of the mixer and agitation continued for around an additional 5 minutes. Prior to adding the cooling water, the carrier phase, e.g. dry blend and heated water, comprised about 2.4% by weight (wet weight) sodium metasilicate.

The contents of the primary portion of the mixer prepared in this Example were examined under a microscope to observe the extent of gelling of the starch granules. Observations revealed that greater than 70% of the starch had gelled. This indicates that the pH resulting from dissolving the modified starch/dry alkali blend to make an adhesive preparation is similar to that of carrier starches wherein caustic is used at the corrugator or when the corrugating adhesive is prepared because gelling is a function of the pH resulting from the components of the carrier. Thus, the preblended carrier starches result in pH values necessary for sufficient gelling of the carrier starch thereby eliminating the need for caustic at the corrugator or at the time the corrugating adhesive is prepared.

Other components of the adhesive formulation were mixed in the secondary portion of the Stein Hall mixer to form the suspended phase. 1,400 milliliters of water were introduced into the secondary portion of the Stein Hall mixer and heated to about 90° F. under agitation. When the temperature reached about 90° F., 725 grams of unmodified starch and 7 grams of 10 molar borax were added to the secondary portion of the Stein Hall mixer and agitation continued. The unmodified starch used for this Example was pearl starch.

The mixture prepared in the primary portion of the Stein Hall mixer was then added to the mixture in the secondary portion over about a 20 minute period while agitation continued. After nearly all of the contents of the primary portion of the Stein Hall mixer were ceased being placed into the secondary portion of the mixer, agitation continued for around 10 minutes to obtain an adhesive composition.

The adhesive composition made in this manner from the preblended carrier starch had a final temperature after mixing of 100° F., the viscosity was 24 seconds measured using a Stein Hall cup and the gel temperature was 154° F. The total solids in the adhesive composition was 26.4% dry basis.

The adhesive formulation prepared for this Example was stored overnight at 100° F. with intermittent mixing, around 5 minutes of mixing for about every 25 minutes of storage. The stored adhesive viscosity was about 25 seconds measured using a Stein Hall cup, and the gel temperature of the stored adhesive was about 155° F. Thus, the corrugating adhesives formulated with the carrier starch of the invention exhibited superior storage and viscosity stability.

EXAMPLE II

An adhesive formulation was prepared with the dry preblended carrier starch for corrugating adhesives of the invention. The carrier starch was prepared using oxidized starch, G551 STABLEBOND starch, and sodium metasilicate for the dry alkali. 125 grams of starch were dry mixed with 25 grams of sodium metasilicate which corresponds to a dry blend comprising about 83.3% dry weight starch and about 16.7% dry weight sodium metasilicate. 500 milliliters of water were placed in the primary portion of a laboratory two stage Stein Hall mixer and heated to about 135° F. under agitation. When the temperature of the water in the primary portion of the mixer reached about 135° F. the dry blend mixture of oxidized starch and sodium metasilicate was introduced into the primary portion of the Stein Hall mixer and agitation was continued for approximately 20 minutes. After around 20 minutes, 300 milliliters of cooling water were introduced into the primary portion of the Stein Hall mixer and agitation continued for around an additional 5 minutes. Prior to adding the cooling water, the carrier phase, e.g. dry blend and heated water, comprised about 3.8% by weight (wet weight) sodium metasilicate.

The contents of the primary portion of the mixer prepared in this Example were examined under a microscope to observe the extent of gelling of the starch granules. Observations revealed that greater than 70% of the starch gelled. This confirms the results obtained for Example I and indicates that the pH resulting from dissolving the modified starch/dry alkali blend to make an adhesive preparation is similar to that of carrier starches wherein caustic is added at the corrugator or when the corrugating adhesive is prepared, because gelling is a function of the pH resulting from the components of the carrier. This confirms that the preblended carrier starches of the invention result in pH values necessary for sufficient gelling of the carrier starch thereby eliminating the need for caustic at the corrugator or at the time the corrugating adhesive is prepared.

Other components of the adhesive formulation were mixed in the secondary portion of the Stein Hall mixer to form the suspended phase. 1,400 milliliters of water were introduced into the secondary portion of the Stein Hall mixer and heated to about 90° F. under agitation. When the temperature reached about 90° F., 725 grams of unmodified starch and 7 grams of 10 molar borax were added to the secondary portion of the mixer and agitation continued. The unmodified starch used for this example was pearl starch.

The mixture prepared in the primary portion of the Stein Hall mixer was then added to the mixture in the secondary portion over around a 20 minute period while agitation continued. After nearly all of the contents of the primary portion of the Stein Hall mixer were placed into the secondary portion of the mixer, agitation continued for around 10 minutes to obtain an adhesive composition.

The viscosity was 21 seconds measured by Stein Hall cup and the gel temperature was about 157° F. which was similar to the gel temperature achieved for the adhesive prepared in Example 1.

EXAMPLE III

Comparative 125 grams of modified starch in the form of oxidized starch were dry mixed with 17.8 grams of dry alkali in the form of sodium metasilicate which corresponds to a dry blend comprising about 87.5% dry weight starch and about 12.5% dry weight sodium metasilicate. 1,600 milliliters of water were placed in the primary portion of a laboratory two stage Stein Hall mixer and heated to about 116° F. under agitation. When the temperature of the water in the primary portion of the Stein Hall mixer reached about 116° F. the dry blend mixture of oxidized starch and sodium metasilicate was introduced into the primary portion of the mixer and agitation was continued for approximately 20 minutes. After around 20 minutes, 400 milliliters of cooling water were introduced into the primary portion of the mixer and agitation continued for around an additional 5 minutes. Prior to adding the cooling water, the carrier phase, e.g. the dry blend and heated water, comprised around 1.0% by weight (wet weight) sodium metasilicate.

The contents of the primary portion were examined under a microscope to observe the extent of gelling of the starch granules. Observations revealed that the starch did not swell or gel. This may be attributable to the dilute conditions of the carrier starch solution in the primary portion of the Stein Hall mixer or the lower mixing temperature, about 116° F. This Example demonstrates that the amount of dry alkali in the blend must be around or greater than 1.0% weight (wet weight), based on the total weight of the carrier phase, prior to the addition of cooling water; and that the mixing temperature should be greater than about 116° F. Because the starch in the solution of the primary portion of the Stein Hall mixer in this Example neither swelled nor gelled, an adhesive formulation was not prepared.

What is claimed is:

1. A dry preblended carrier starch for corrugating adhesives comprising an admixture of from about 70% to 90% by dry weight of oxidized starch and from about 30% to 10% by dry weight of dry alkali selected from the group consisting of sodium metasilicate and trisodium phosphate wherein said dry preblended carrier starch, when dissolved in water, forms a carrier phase for a corrugating adhesive which does not require the addition of caustic compounds or silicates.

2. The dry preblended carrier starch of claim 1 wherein said oxidized starch is hypochlorite-oxidized starch.

3. The dry preblended carrier starch of claim 1 further comprising mineral oil.

4. The dry preblended carrier starch of claim 1 further comprising fillers and bulking agents.

5. A corrugating adhesive comprising the carrier starch of claim 1.

6. A corrugated board comprising the carrier starch of claim 1.

7. A method of making a dry preblended carrier starch comprising dry mixing from about 70% dry weight to about 90% dry weight oxidized starch with about 30% dry weight to about 10% dry weight dry alkali selected from the group consisting of sodium metasilicate and trisodium phosphate.

8. The method of claim 7 wherein said oxidized starch is hypochlorite-oxidized starch.

9. The method of claim 7 comprising the additional step of adding mineral oil when mixing said modified starch and dry alkali.

10. The method of claim 7 comprising the additional step of adding fillers and bulking agents when mixing said modified starch and dry alkali.

11. A method for making a corrugating adhesive comprising:
 a) preparing a carrier phase by heating water under agitation to a temperature from about 120° F. to about 180° F. and then admixing under continuous agitation a dry preblended carrier starch comprising from about 70% dry weight to about 90% dry weight oxidized starch and from about 30% dry weight to about 10% dry weight dry alkali selected from the group consisting of sodium metasilicate and trisodium phosphate with said heated water, the amount of dry preblended carrier starch being such that the mixture comprises around 1% to around 8% dry alkali based on total weight of said carrier phase;
 b) preparing a suspended phase by admixing water, starch and borax; and
 c) admixing said carrier phase and said slurry phase, wherein said corrugating adhesive is prepared without any caustic or additional silicate compounds.

12. The method of claim 11 wherein said oxidized starch hypochlorite-oxidized starch.

13. The method of claim 11 comprising the additional step of adding cooling water to said carrier phase after said carrier phase is prepared.

14. The method of claim 11 wherein said carrier phase is prepared by heating water under agitation to a temperature of at least about 135° F.

15. A corrugating adhesive which does not require the addition of caustic compounds or silicates which in an aqueous emulsion comprises from about 2% to about 10% by weight of the adhesive of an admixture of from about 70% to about 90% by dry weight of oxidized starch and from about 30% to about 10% by dry weight of dry alkali selected from the group consisting of sodium metasilicate and trisodium phosphate; and from about 98% to about 90% by weight of the adhesive of water, starch and borax wherein the starch comprises about 10 to about 30% by weight of the adhesive and borax comprises about 0.3 to about 1.0% by weight of the adhesive.

16. A method for making a corrugated board comprising joining a corrugated medium to at least one liner using a corrugating adhesive prepared with a dry preblended carrier starch comprising from about 70% dry weight to about 90% dry weight oxidized starch and from about 30% dry weight to about 10% dry weight dry alkali selected from the group consisting of sodium metasilicate and trisodium phosphate wherein said dry preblended carrier starch is admixed with heated water to form a carrier phase in which said dry alkali is present in said carrier phase in an amount of from about 1% to 8% based on total weight of carrier starch and heated water in the carrier phase, wherein said corrugating adhesive is prepared without any caustic or additional silicate compounds.

\* \* \* \* \*